United States Patent [19]

Jeffway, Jr. et al.

[11] Patent Number: 5,069,361

[45] Date of Patent: Dec. 3, 1991

[54] CRAYON CADDY

[75] Inventors: Robert W. Jeffway, Jr., Northampton, Mass.; Catherine R. Dobosz, Monroe, Conn.

[73] Assignee: Western Publishing Company, Inc., Racine, Wis.

[21] Appl. No.: 558,010

[22] Filed: Jul. 26, 1990

[51] Int. Cl.[5] ...................... G07F 11/00; B65G 59/00; A45C 11/34

[52] U.S. Cl. ...................................... 221/82; 221/281; 206/214; 206/371

[58] Field of Search ............ 206/214, 244, 574, 44.11, 206/557, 371; 211/59.2, 15; 221/281, 195, 82

[56] References Cited

U.S. PATENT DOCUMENTS

| | | | |
|---|---|---|---|
| 898,569 | 9/1908 | Faris | 221/82 |
| 1,025,235 | 5/1912 | Beal et al. | 221/82 |
| 1,715,726 | 6/1929 | Tomoda | 221/281 |
| 1,800,035 | 4/1931 | Vierling . | |
| 2,176,394 | 10/1939 | Elder | 221/82 |
| 2,660,983 | 12/1953 | Lanning | 206/214 |
| 2,819,814 | 1/1958 | Hatch | 221/83 |
| 3,905,529 | 9/1975 | Leu | 221/74 |
| 3,970,195 | 7/1976 | Franklin | 221/88 |
| 4,150,766 | 4/1979 | Westendorf et al. | 221/112 |
| 4,271,979 | 6/1981 | Manz | 221/288 |
| 4,809,877 | 3/1989 | Albright | 221/75 |
| 4,838,453 | 6/1989 | Luckstead | 221/15 |

FOREIGN PATENT DOCUMENTS

| | | | |
|---|---|---|---|
| 965199 | 6/1957 | Fed. Rep. of Germany | 206/214 |
| 1259117 | 1/1968 | Fed. Rep. of Germany | 206/557 |

*Primary Examiner*—Paul T. Sewell
*Assistant Examiner*—M. D. Patterson
*Attorney, Agent, or Firm*—Amster, Rothstein & Ebenstein

[57] ABSTRACT

A rotatable caddy includes a stationary frame and a generally cylindrical carrier rotatably disposed in the frame and defining longitudinally-extending compartments on the periphery thereof for the storage of elongate articles therein, such as crayons. A knob is provided for rotating the carrier about its longitudinal axis relative to the frame, and another knob is provided for discharging from a selected compartment any elongate article therein. A passageway is provided for feeding an elongate article into an empty one of the compartments without disassembly of the caddy and for releasably maintaining the elongate articles fed into the compartments in their respective compartments during rotation of the carrier relative to the frame. An anti-jamming mechanism is preferably also provided for relocating an elongated article only partially received in a compartment aligned with the feed means from that compartment and into a storage location as the carrier rotates.

15 Claims, 8 Drawing Sheets

FIG. 3
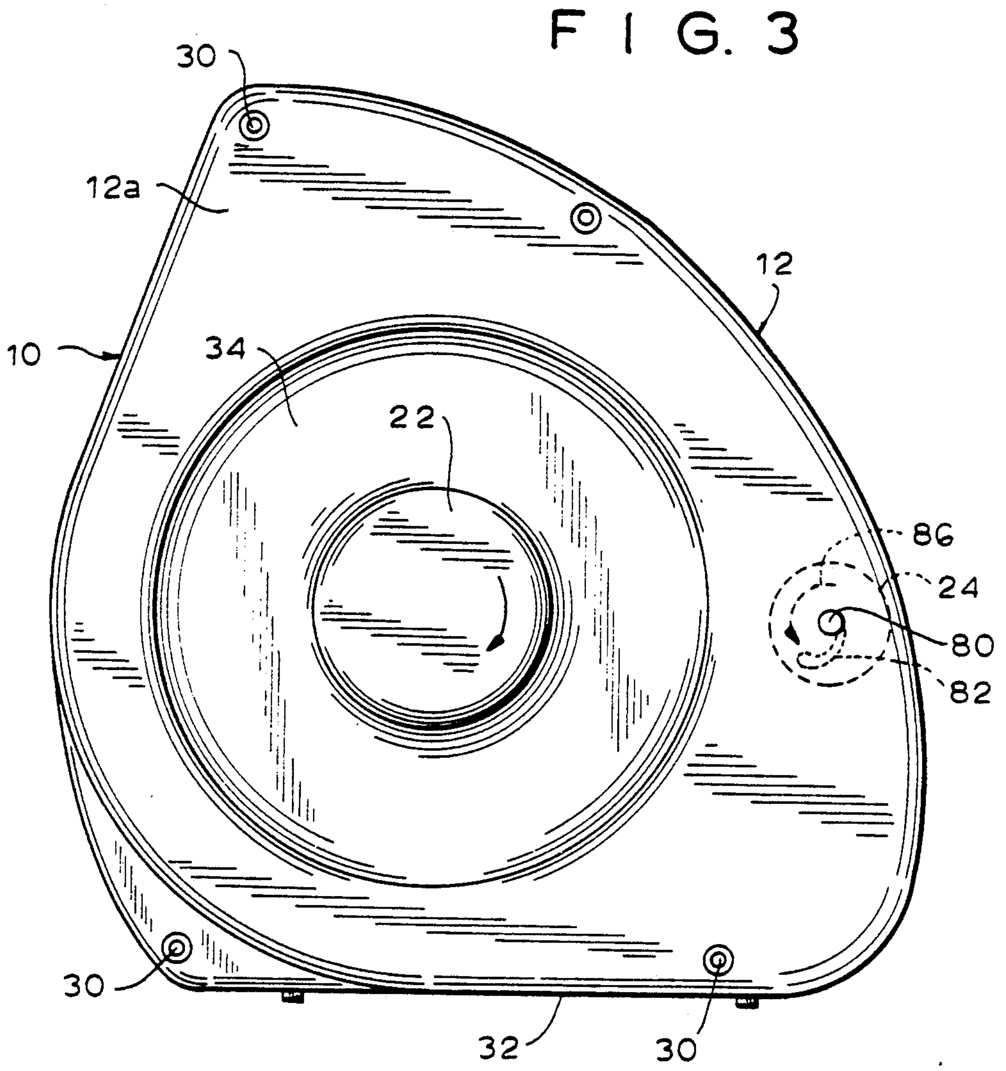
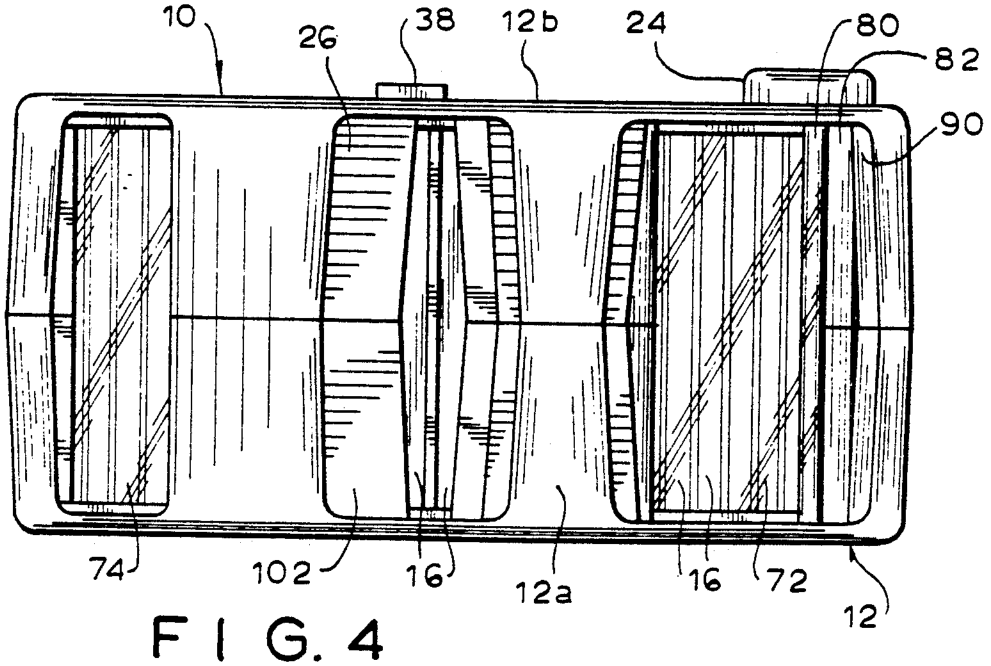
FIG. 4

FIG. 5
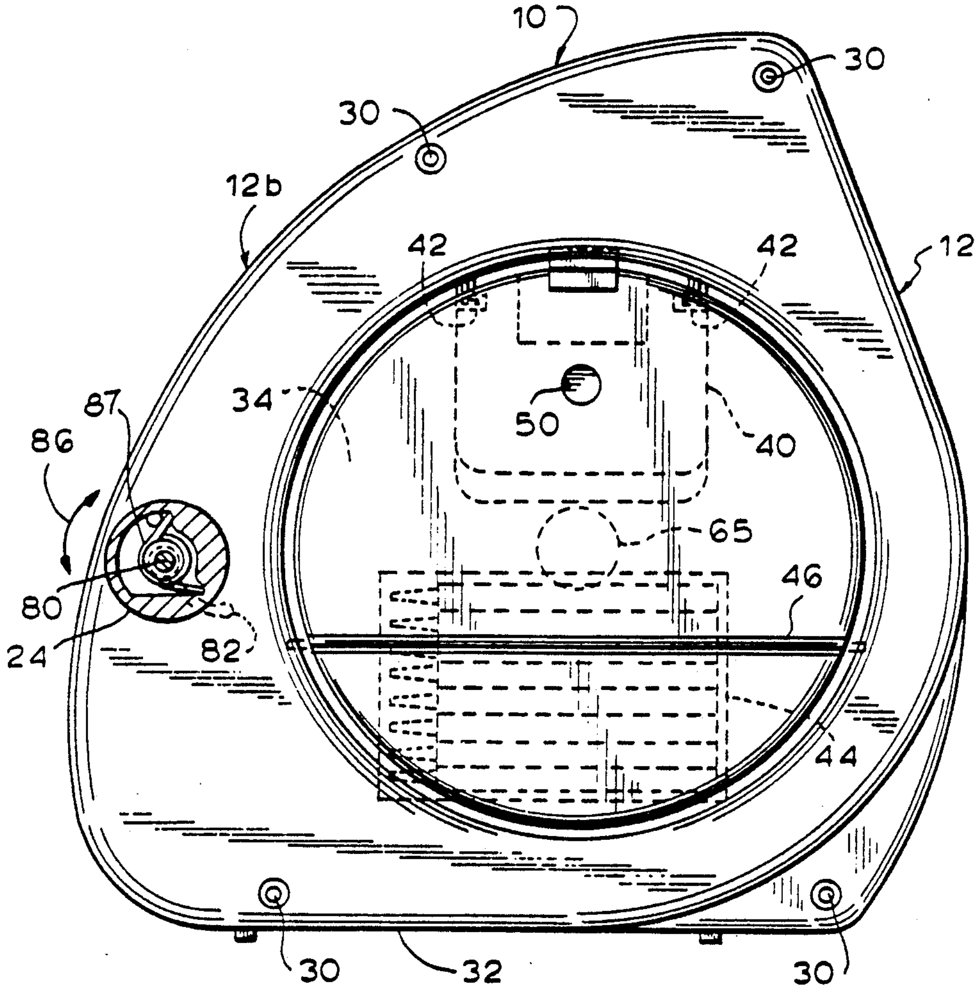
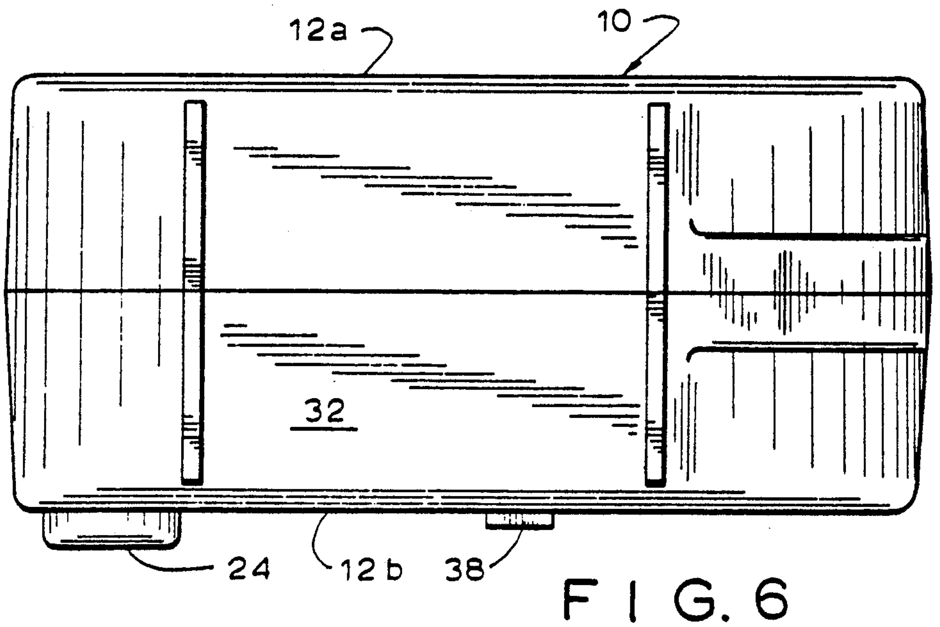
FIG. 6

CRAYON CADDY

BACKGROUND OF THE INVENTION

The present invention relates to a caddy, and more particularly to a caddy having a rotatable carrier for receiving, storing and releasing elongate articles, such as crayons.

In order to inculcate in a child the habit of maintaining his toys and other possessions in a neat and orderly manner, and hopefully to obtain for the guardian of the child the benefits of a child having such a habit (including the benefit of a neat and orderly room), it is desirable to provide the child with an attractive and fun-to-use caddy which will receive the articles, store them, and allow selected ones to be discharged in a neat, orderly and functional manner. It is especially important to provide such a device for elongate articles, such as crayons, which are generally exposed at both ends and capable of leaving marks on children, furniture and the like if not properly grasped intermediate the ends thereof (relative to, for example, pencils which have the lead or graphite exposed at only one end thereof).

Accordingly, it is an object of the present invention to provide a caddy for receiving, storing and discharging elongate articles such as crayons.

Another object is to provide such a caddy which is attractive and fun to use.

A further object is to provide such a caddy including an anti-jamming mechanism to prevent articles from becoming locked in between the rotatable carrier and a stationary frame.

It is also an object to provide such a caddy which is of simple, economical and rugged construction.

SUMMARY OF THE INVENTION

It has now been found that the above and related objects of the present invention are obtained in a caddy comprising a stationary frame and a generally cylindrical carrier rotatably disposed in the frame. The carrier defines longitudinally-extending compartments on the periphery thereof for the storage of elongate articles (such as crayons) therein. The caddy additional includes means for rotating the carrier about its longitudinal axis relative to the frame, and means for feeding an elongate article into an empty one of the compartments without disassembly of the caddy. Means are provided for releasably maintaining the elongate articles fed into the compartments in their respective compartments during rotation of the carrier relative to the frame, and for discharging from a selected compartment any elongate article therein.

Preferably, the carrier is rotatably disposed in the frame with its longitudinal axis generally horizontal, the compartments are configured and dimensioned to store the elongate articles therein with the longitudinal axes thereof generally horizontal, and the discharge means discharges the elongate article with the long axis of the elongate article being maintained generally horizontal.

In a preferred embodiment the feed means feeds an elongate article into one of the compartments under the influence of gravity, and successively feeds elongate articles into successive ones of the compartments as the carrier rotates. The caddy additionally includes a hopper and the feed means successively feeds elongate articles from the hopper into the compartments as the rotation of the carrier brings successive empty compartments into operative relationship with the hopper.

An anti-jamming mechanism precludes the feed means from feeding an elongate article into a non-empty one of the compartments. The carrier is rotatable by the rotating means in only one direction of rotation, and the anti-jamming mechanism includes a storage location, disposed intermediate the feed means and one of the compartments aligned with the feed means and offset in the direction of rotation of the carrier relative to the aligned one compartment, for storage of an elongate article when the aligned one compartment is not empty. The anti-jamming mechanism includes means for relocating an elongate article only partially received in the aligned one compartment from the aligned one compartment and into the storage location as the carrier rotates. The storage location is configured and dimensioned such that the presence of an elongate article in the storage location blocks the feed means from operation and enables such elongate article in the storage location to feed into the next empty one of the compartments to become aligned with the feed means.

Preferably the discharge means discharges an elongate article from a selected compartment under the influence of gravity and includes a door movable between a first position precluding discharge of an elongate article from a selected compartment and an open position enabling discharge of an elongate article from a selected compartment. The discharge means additionally includes means for moving the door to its open position, and means for biasing the door to its closed position.

BRIEF DESCRIPTION OF THE DRAWING

The above brief description, as well as further objects and features of the present invention, will be more fully understood by reference to the following detailed description of the presently preferred, albeit illustrative, embodiments of the present invention when taken in conjunction with the accompanying drawing wherein:

FIG. 3 is a side elevational view thereof from the one side;

FIG. 4 is a top plan view thereof;

FIG. 5 is a side elevational view thereof from the other side, with the door of the frame being shown in an open position;

FIG. 6 is a bottom plan view thereof;

DETAILED DESCRIPTION OF PREFERRED EMBODIMENTS

Figure 1:
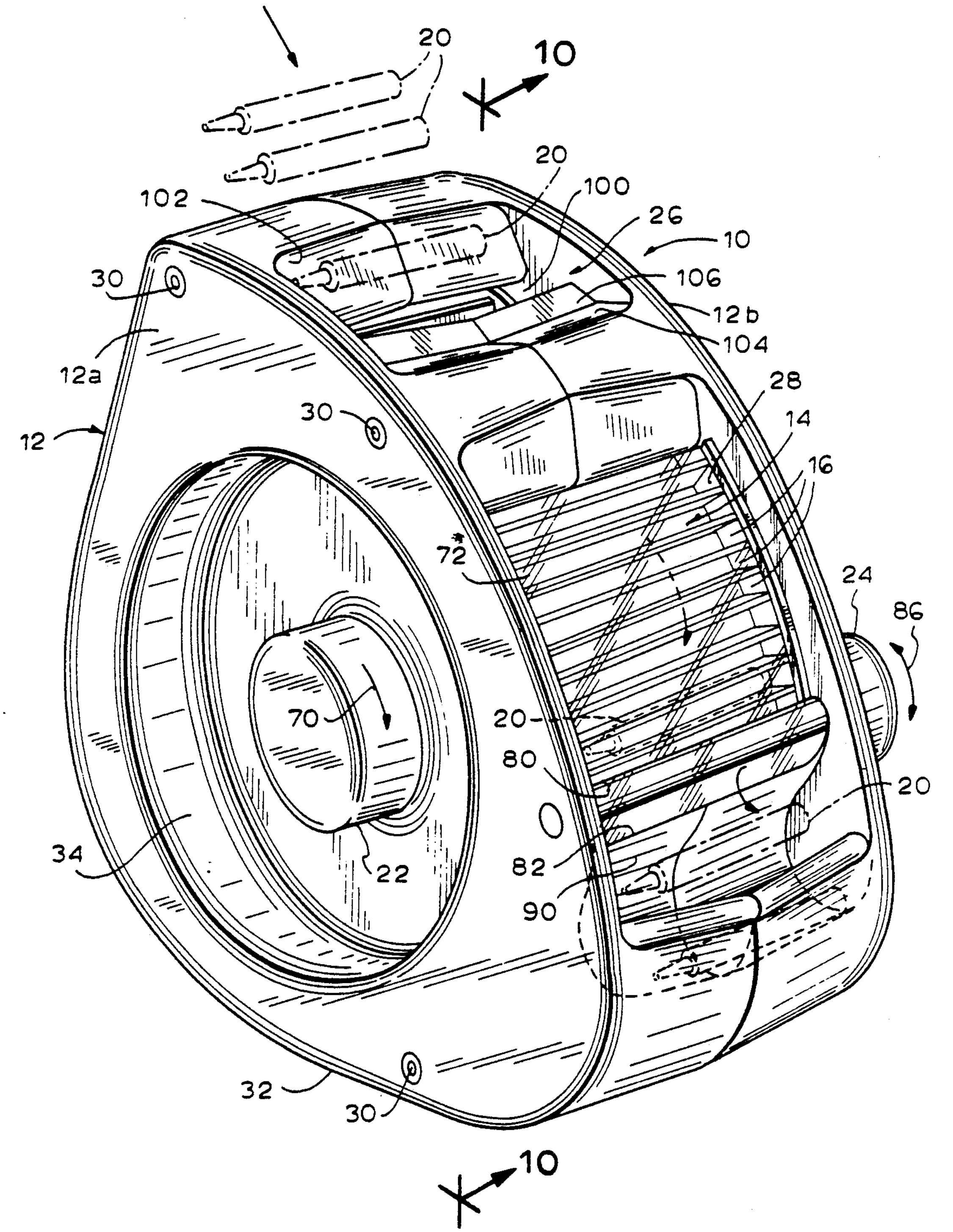
FIG. 1 is an isometric view of a caddy according to the present invention, from the front and one side thereof, with various crayons being illustrated in solid line in the carrier compartments and in phantom line outside of the carrier compartments.

Referring now to the drawing, and in particular to FIGS. 1-8 thereof, therein illustrated is a caddy according to the present invention, generally designated by the reference numeral 10. In its basic aspect, the caddy 10 comprises a stationary frame generally designated 12 and a generally cylindrical carrier generally designated 14. The carrier 14 is rotatably disposed in the frame 12 and defines a plurality of longitudinally-extending compartments 16 on the periphery thereof for the storage of elongate articles therein, such as crayons 20. The caddy 10 additionally includes means 22, such as a knob, for rotating the carrier 14 about its longitudinal axis relative to the frame 12, and means 24, such as a knob, for discharging from a selected compartment 16 any elongate article 20 therein. Finally, the carrier 10 further includes means 26 for feeding an elongate article 20 into an empty one of the compartments 16 without disassembly of the caddy 10 and means 28 for releasably maintaining the elongate articles fed into the compartments in their respective compartments 16 during rotation of the carrier 14 relative to the frame 12.

Figure 2:
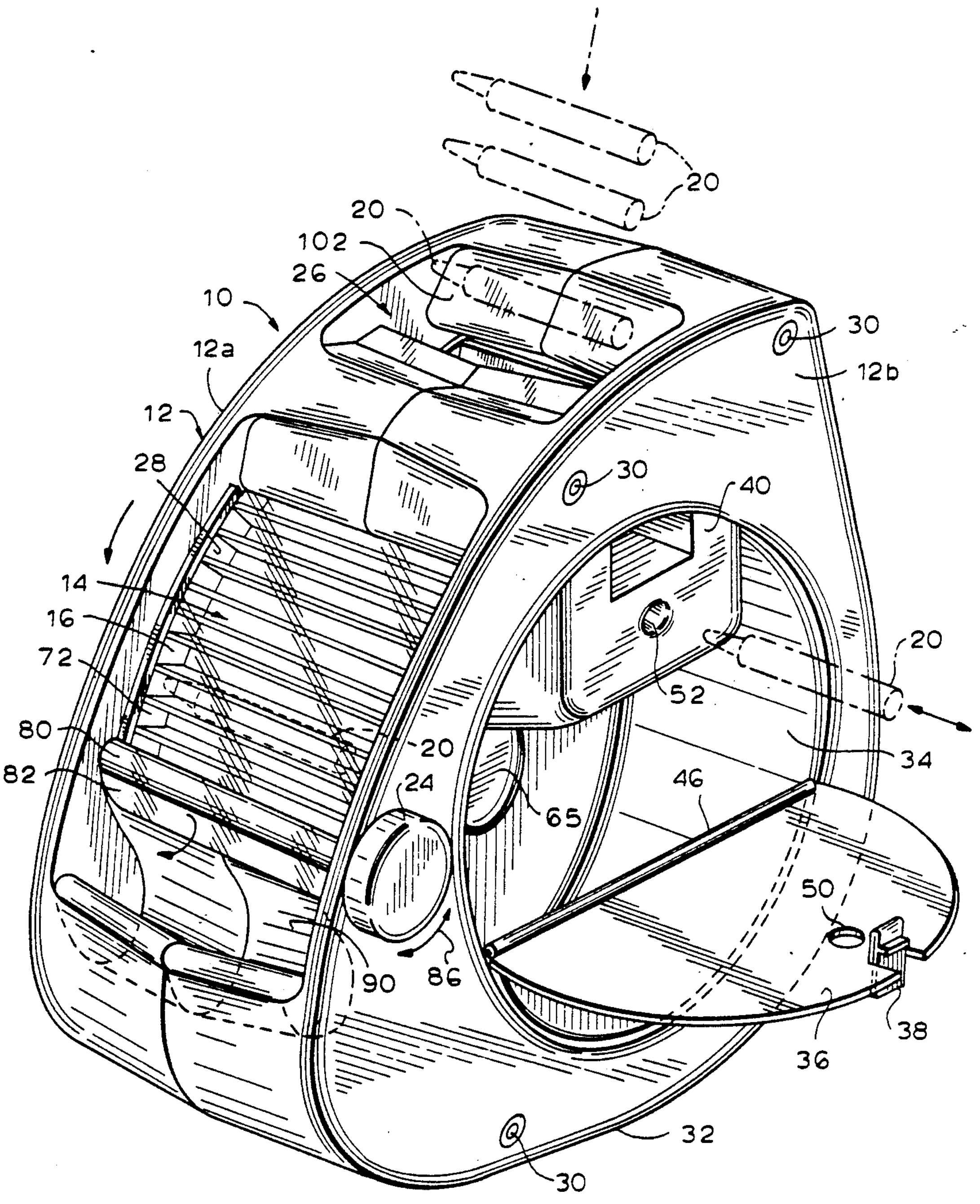
FIG. 2 is an isometric view thereof from the other side.
Figure 8:
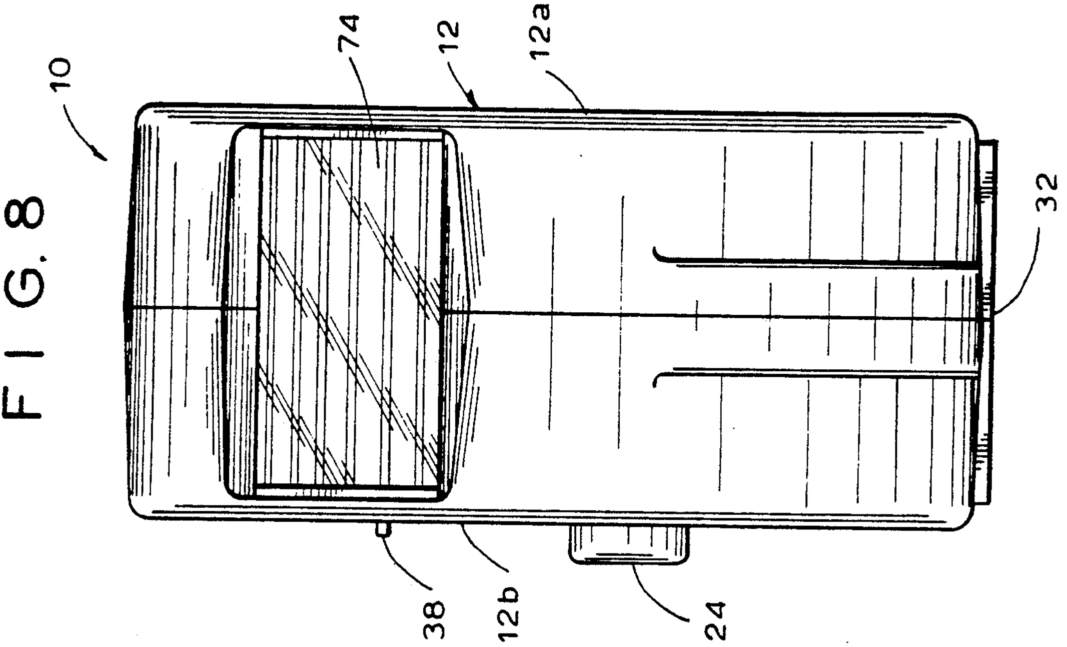
FIG. 8 is a rear elevational view thereof.
Figure 7:
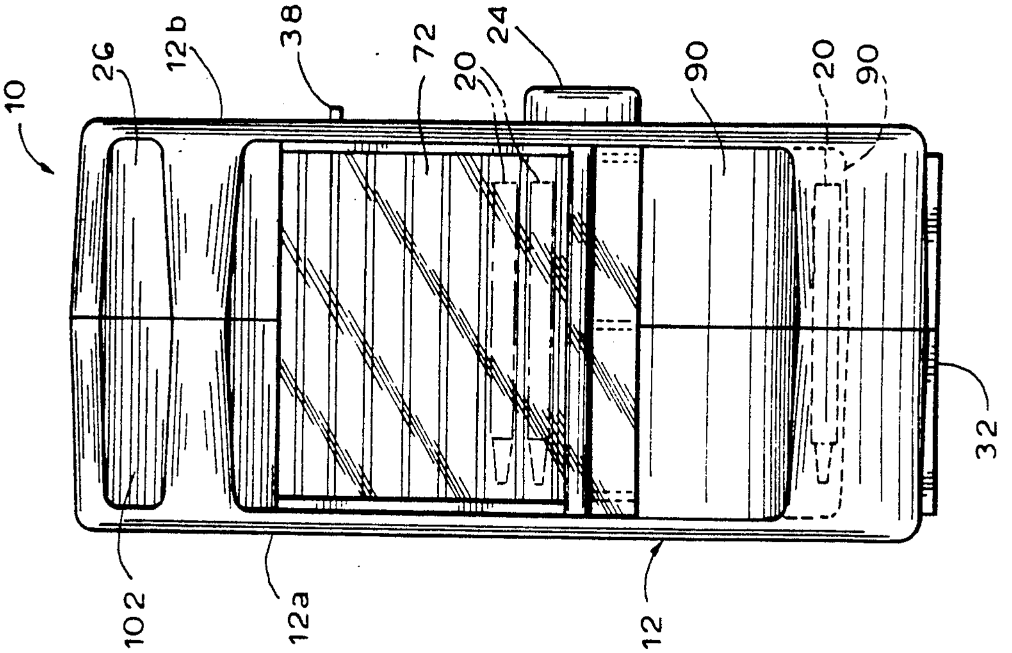
FIG. 7 is a front elevational view thereof.

More particularly, the stationary frame 12 includes right and left members 12*a* and 12*b*, respectively, which are secured together by means of fastening elements 30, such as screws, bolts, sonic welds or the like. The frame 12 has a substantially flat bottom 32 enabling it to rest in a relatively stable manner upon a substantially flat support or substrate (not shown). The right side 12*a* of the frame 12 defines a well 34 in which is disposed a knob 22 for rotating the carrier 14 relative to the frame 12 (see FIG. 1). The left side 12*b* of the frame 12 (see FIG. 2) defines a compartment 34 having a door 36 which is normally closed to cover the opening thereinto (see FIGS. 9 and 10) but is openable to permit access to the interior of the compartment 34 (as shown in FIG. 2 and in phantom line in FIG. 10). A biased latch 38 both maintains the door 36 in its normally closed position through its engagement with the abutting portion of frame side 12*b* and provides a handy grip for opening the door 36 downwardly once the latch 38 is released. The door 36 is secured to the portion of the left frame side 12*b* defining the open wall of the compartment 34 by means of a shaft 46 journaled in the opening-defining wall of the frame side 12*b*, with the door 36 being pivotably mounted thereon.

Figure 9:
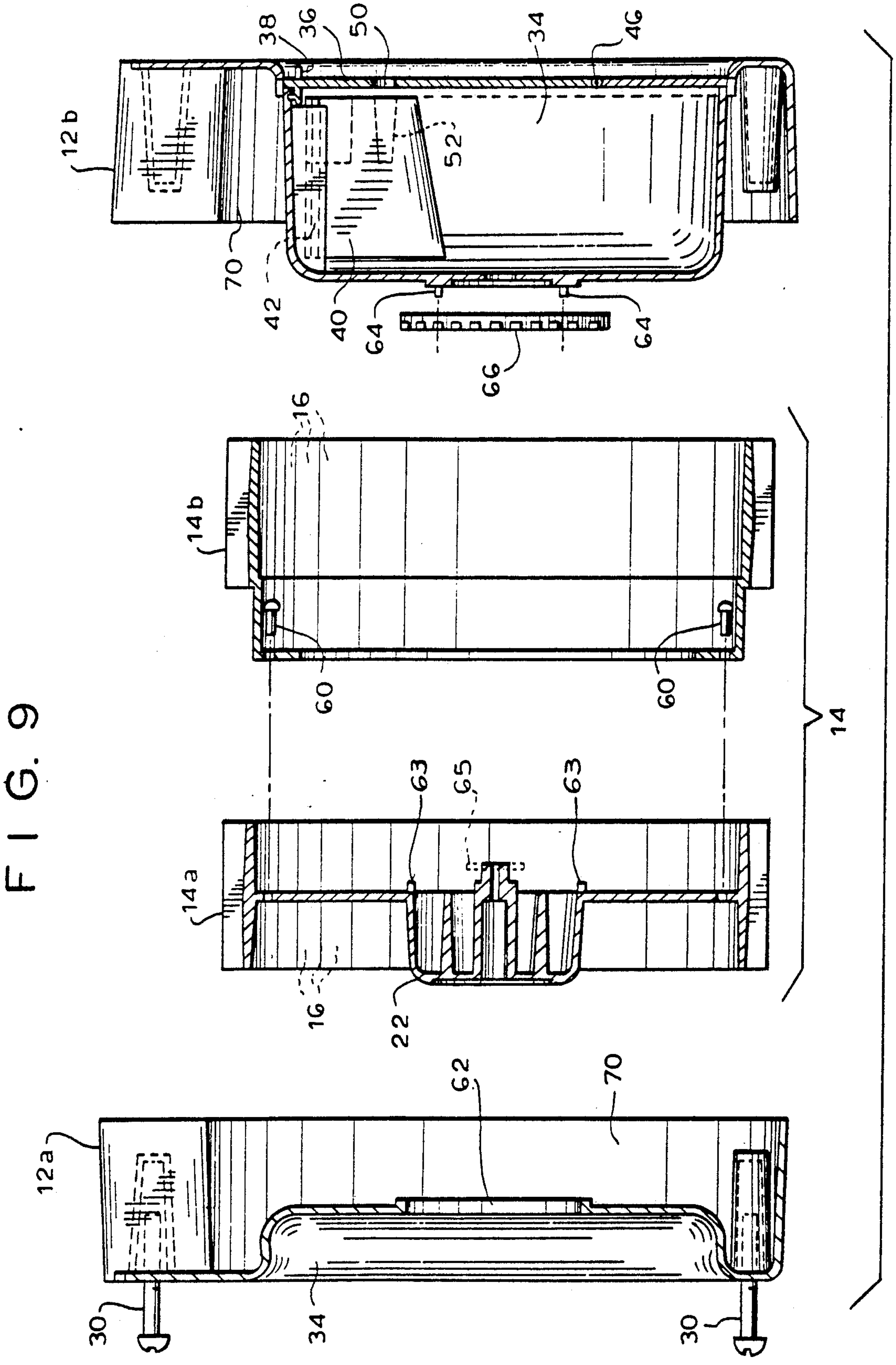
FIG. 9 is an exploded view thereof.
Figure 10:
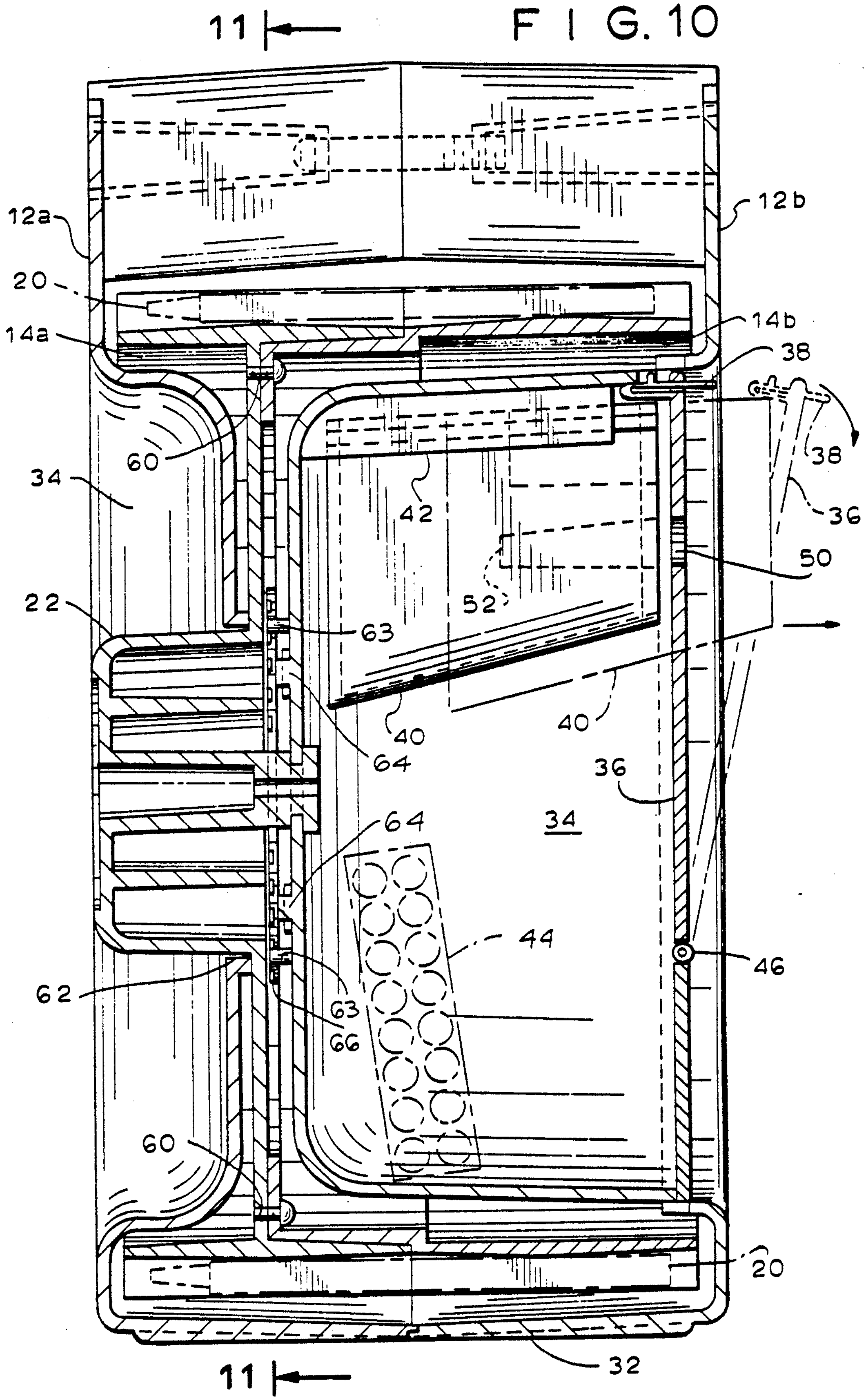
FIG. 10 is a sectional view thereof taken along the line 10—10 of FIG. 1.

A crayon sharpener 40 is supported within the compartment 34 on tracks 42 (best shown in FIGS. 5 and 9–10), the crayon sharpener 40 being removable from the compartment 34 for cleaning and emptying (as shown in phantom line in FIG. 10). The compartment door 36 is preferably provided with an aperture 50 aligned with the aperture 52 of the sharpener 40 so that a crayon inserted through the apertures 50, 52 may be sharpened without opening the compartment door 36. The compartment 34 is also useful for storing a box 44 of replacement crayons (as shown in FIGS. 5 and 10) or the like.

Adjacent the front of left frame side 12*b* is the knob 24 for discharging from a selected compartment 16 any crayon 20 therein. While the discharge knob 24 is preferably disposed on an opposite side of the frame from the rotating knob 22, thereby to minimize confusion and to permit two handed operation of the caddy 10 (with one hand turning one knob and the other hand turning the other knob), clearly the principles of the present invention permit both knobs 24, 28 to be disposed on the same frame side 12*a*, 12*b*.

Referring now to FIGS. 9 and 10 as well, the generally cylindrical carrier 14 includes right and left side members 14*a* and 14*b*, respectively, which are secured together by means of fastening elements 60, such as screws, bolts, sonic welds or the like. The right carrier side 14*a* defines or is secured to the knob 22 for rotation therewith, thereby enabling the carrier 14 to be rotated about its longitudinal axis relative to the frame 12. The rotating knob 22 projects outwardly into well 34 through an aperture 62 (see FIG. 9) in the right frame side 12*a*. The shaft 65 of knob 22 is journalled in the left frame side 12*b* and optionally the end thereof (illustrated in phantom line in FIG. 9) peened over to lock it thereto (as illustrated in FIG. 10). The rotating knob 22 is rotatable in only one direction (see arrow 76) due to the pawls 63 of the carrier 14, which engage a stationary ratchet wheel 66 secured to left frame side 12*b*. The ratchet wheel 66 may be integrally molded with the frame 12 or, as illustrated, separately formed and subsequently secured thereto by conventional fastening means such as pins 64. The carrier 14 is supported in the frame 12 by the rotating knob 22 extending through frame aperture 62 on the right frame side 12*a* and by the journalling of the shaft 65 of knob 22 in the left frame side 12*b*.

The carrier 14 defines a plurality of radially outwardly open compartments 16, each compartment being configured and dimensioned to receive therein a single crayon 20. The frame 12 has an inner surface defining a cylindrical aperture 70 with has an inner diameter just slightly larger than the outer diameter of the cylinder 14, the aperture 70 being configured and dimensioned to maintain the crayons 20 within the compartments 16—that is, acting as the outer walls of the compartments 16—while still permitting free rotation by the cylinder 14 relative to the stationary frame 12.

In order to facilitate viewing of the crayons 20 within the compartments 16 as the carrier 14 is rotated relative to the frame 12, the front of frame 12 (see FIGS. 1–2 and 7) and the rear of the frame 12 (see FIG. 8) are cut away and provided with transparent windows 72, 74, respectively, through which the aligned compartments 16 and any contents thereof (such as crayons 20) are visible. The transparent windows 72, 74 assist in maintaining the crayons 20 within the compartments 16. While the transparent windows 72, 74 may be separate inserts disposed into the frame 12 (which may otherwise be formed of a non-transparent material) and maintained therein by appropriately provided channels, as illustrated, alternatively the windows 72, 74 may be integrally formed with and part of the frame 12. The front window 72 is disposed immediately above the discharge knob 24. The direction of rotation enabled for the cylinder 14 relative to the frame 12 by the pawl/ratchet wheel arrangement 63, 66 is in the direction of arrow to (see FIG. 1) so that the crayons 20 within the compartments 16 are visible as the carrier is rotated to bring such crayons 20 into alignment with the discharge knob 24.

The discharge knob 24 is secured to the frame 12 by means of a pivot shaft 80 extending through both portions of the frame 12*a*, 12*b*. The pivot shaft 80 has a depending door 82 secured thereto for rotation therewith, the door 82 being configured and dimensioned to block the aperture 84 intermediate the bottom of the window 72 and the adjacent portion of the frame 12 therebelow. The gap 84 (see FIG. 11) is of sufficient size to enable a crayon 20 to pass from the compartment 16 aligned therewith and through the gap 84 when the door 82 is not closing the gap 84. The gap 84 is located on the lower front quadrant of the carrier 14 so that the selected crayons 20 of a given compartment 16 will pass through the gap 84 under the influence of gravity when the door 82 is open. The door 82 may be rotated, via discharge knob 24 and connecting pivot shaft 80, between a gap-opening position (shown in phantom line in FIG. 11) which enables the crayon 20 to fall through the gap 84 and a gap-closing position (shown in solid line in FIG. 11) wherein the gap 84 is closed by the door 82 to maintain the crayon 20 within the aligned compartment 16. As indicated by arrow 86, the discharge knob 24 may be rotated in either of two opposite directions (that is, either clockwise or counterclockwise) between the gap-opening and gap-closing positions. The discharge knob 24 is preferably biased—for example, by spring 87, as illustrated in FIG. 5 —toward the gap-closing position so that, after a crayon has been discharged, the door 82 closes of its own accord once the discharge knob 24 is released.

The front of frame 12 is provided with a well or recess 90 immediately below the door 82 so that a crayon 20 dropping through the gap 84 is held therein in a horizontal orientation. The well 90 is accessible by the user through the front of the caddy 10 and is of sufficient size so that the user may insert at least a few fingers into the well 90 to remove any crayons 20 therein by grasping the centers of the crayons—that is, the portion of the length of the crayons which is usually covered by paper—without dirtying his fingers. The well 90 is preferably of sufficient capacity to hold at least a few crayons 20 at one time so that a few crayons 20 may be selected and discharged from the carrier 14 before any are removed from the well 90. Because the discharge mechanism 24 discharges the crayon 20 from compartment 16 with the long axis of the crayon 20 being maintained generally horizontal, the point of the crayon 20 (regardless of which end the point is on) does not become dulled as it might if the crayon were allowed to drop onto that point—i.e., if the discharge mechanism discharged the crayon 20 with its long axis generally vertical.

Figure 11:
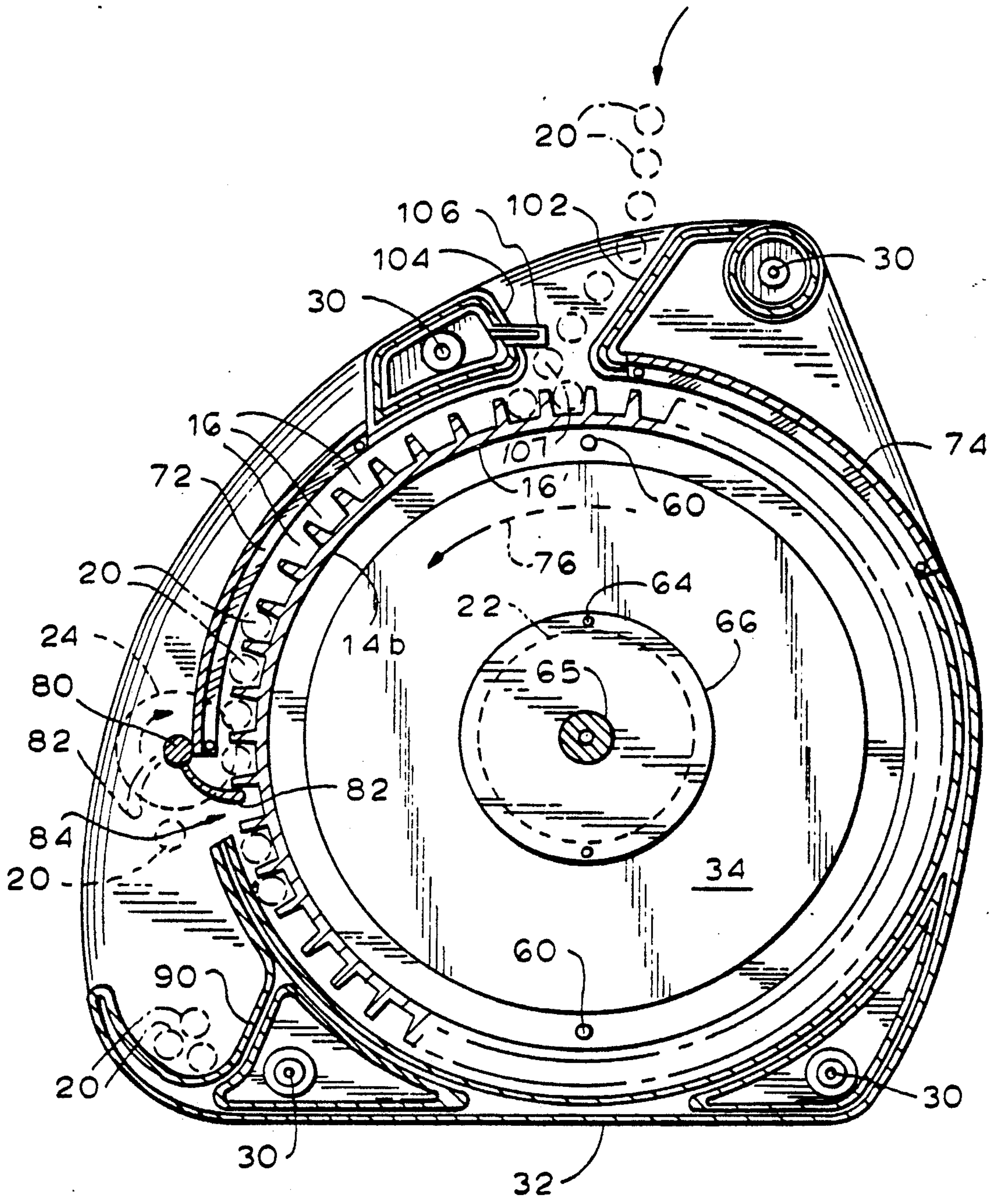
FIG. 11 is a sectional view thereof taken along the line 11—11 of FIG. 10.

The mechanism 26 for feeding a crayon 20 into an empty one of the compartments 16 without disassembling the caddy 10 comprises an aperture 100 in the top of frame 12 which acts as a hopper. The rear of opening 100 is a surface 102 of frame 12 inclined downwardly and forwardly so that a crayon 20 dropped thereon will roll downwardly and forwardly under the influence of gravity, in the direction of rotation of the carrier 14. The front of aperture 100 is a surface 104 of the frame having a ledge 106 projecting rearwardly. The ledge 106 runs the full width of the opening 100 and has its free end spaced above the top of adjacent compartment 16 by just slightly more than the thickness of the crayon 20. The ledge 106 extends rearwardly from the front surface 104 of aperture 100 about the width of a crayon 20 and leaves room for passage of a crayon 20 through the gap between the rear surface of ledge 106 and the frame surface 102. The ledge 106, in conjunction with the portion of the front surface 104 of aperture 100 below the ledge 106 and the tops of the aligned compartment 16 of the carrier 14 therebelow forms a storage location 107 (best shown in FIG. 11) configured and dimensioned to receive and hold a crayon 20 relative to a compartment 16′ aligned with the normal direct flow of the queue of crayons 20 through the aperture 100 (as illustrated in FIG. 11). When a partial crayon or crayon fragment is disposed in the aligned compartment 16′, a crayon 20 fed into that compartment 16′ will have one portion thereof enter the compartment and the other portion project upwardly out of the compartment, in a position to become jammed between the rotating carrier 14 and the stationary frame 12. The ledge 106 prevents such jamming by providing a cam surface which acts on the upwardly projecting portion of the crayon 20, forcing the crayon 20 into a horizontal orientation so that it can enter the storage location 107 under the ledge 106. If the aligned compartment 16′ is fully occupied, the crayon 20 cannot enter the aligned compartment 16′ at all and will also move into the storage location 107 under ledge 106 as the carrier 14 rotates.

As further rotation of the carrier 14 brings an empty compartment 16 into appropriate alignment with aperture 100, the crayon 20 stored in the storage location 107 under ledge 106 will first drop into that aligned compartment, even there may be other crayons 20 in the queue within aperture 100. The crayons in that queue will have to wait for yet another empty compartment 16 to become aligned with the aperture 100 as feeding of crayons 20 from the storage location 107 under ledge 106 takes precedence over feeding from the queue in aperture 100. This priority results from the width (from front to rear) of the storage location 107 under ledge 106 and the width of the aperture 100 adjacent thereto being so small that a crayon in that storage location 107 extends rearwardly partially into aperture 100 and blocks the flow path of crayons in the queue of aperture 100, thus ensuring that the crayon in the storage location 107 under ledge 106 takes precedence over the crayons in the queue of aperture 100.

To use the caddy of the present invention, crayons 20 are dropped into aperture 100 of the feed mechanism 26, preferably as the rotating knob 22 is rotated in the direction of arrow 76, with each crayon 20 dropping into a successive compartment 16 of the carrier 14. In the event that one compartment 16′ of the carrier 14 aligned with the opening 100 is already occupied in whole or in part, the first crayon in the queue will move into the storage location 107 under ledge 106 as the carrier 14 is rotated further. In the event that that compartment 16′ is only partially occupied, as by a fragment of a crayon, the first crayon in the queue will drop partially into that aligned compartment 16′, but have a portion thereof extending upwardly. As the carrier 14 is further rotated, the under surface of ledge 106 will act upon that projecting portion of the crayon 20 and force the entire crayon 20 into a substantially horizontal orientation, with that crayon then moving into the storage location 107 under ledge 106. A portion of the crayon in the storage location 107 will project outwardly therefrom and towards the rear sufficiently to block the next crayon in the queue of aperture 100 from feeding into the next available compartment 16. As the carrier is rotated further and a new aligned compartment 16′ which is empty appears, the crayon in the storage location 107 under ledge 106 will drop into that aligned compartment 16′, and the first crayon in the queue of aperture 100 will then fall into the next empty compartment 16 to become aligned with the aperture 100.

When it is desired to remove a crayon of a particular color from the caddy 10, the carrier 14 is rotated by means of rotating knob 22 until a crayon of the appropriate color is visible in the window 72 and supported in its compartment 16 only by the door 82. The discharge knob 24 is then rotated to open door 82 and allow the crayon 20 to fall into the well 90 for easy horizontal removal from the caddy 10. Once the discharge knob 24 is released, the door 82 is automatically closed.

While the present invention has been described hereinabove in terms of rotating knob 22 and discharge knob 24, clearly other mechanisms may also be used. For example, in an electrified version of the caddy, rotation could be controlled by a switch which actuates a battery-driven motor, with appropriate gearing and clutching to enable a useful rotational speed of the carrier relative to the frame. Discharge knob 24 may similarly be electrified or replaced by a mechanical equivalent such as a slide or lever effective to open the door 82 when it is desired to discharge a selected crayon 20 into the well 90.

To summarize, the present invention requires a caddy for receiving, storing and discharging elongate articles, such as crayons, the caddy being attractive and fun to use as well of simple, economical and rugged construction. The caddy includes an anti-jamming mechanism to prevent articles from becoming locked in between the rotatable carrier and its stationary frame.

Now that the preferred embodiments of the present invention have been shown and described in detail, various modifications and improvements thereon will become readily apparent to those skilled in the art. Accordingly, the spirit and scope of the present invention is to be construed broadly and to be limited only by the appended claims, and not by the foregoing disclosure.

We claim:

1. A caddy comprising:

(A) a stationary frame including a hopper;

(B) a generally cylindrical carrier rotatably disposed in said frame and defining longitudinally-extending compartments on the periphery thereof for the storage of elongate articles therein;

(C) means for rotating said carrier about its longitudinal axis relative to said frame;

(D) means for feeding an elongate article into an empty one of said compartments without disassembly of said caddy; said feed means successively feeding elongate articles from said hopper into said compartments as the rotation of said carrier brings successive empty compartments into operative relationship with said hopper;

(E) means for releasably maintaining the elongate articles fed into said compartments in their respective compartments during rotation of said carrier relative to said frame; and (F) means for discharging from a selected compartment any elongate article therein.

2. (B) a generally cylindrical carrier rotatably disposed in said frame and defining longitudinally-extending compartments on the periphery thereof for the storage of elongate articles therein;

(C) means for rotating said carrier about its longitudinal axis relative to said frame;

(D) The caddy of claim 1 wherein said feeding means comprises means for feeding only a single elongate article at a time into an empty one of said compartments without disassembly of said caddy

3. The caddy of claim 1 wherein said caddy is a crayon caddy and the elongate articles are crayons.

4. The caddy of claim 1 wherein said compartments are configured and dimensioned to store the elongate articles therein with the longitudinal axes thereof generally horizontal.

5. The caddy of claim 1 wherein said feed means feeds an elongate article into one of said compartments under the influence of gravity.

6. The caddy of claim 1 wherein said feed means successively feeds elongate articles into successive ones of said compartments as said carrier rotates.

7. The caddy of claim 1 wherein said discharge means discharges an elongate article from a selected compartment under the influence of gravity.

8. A caddy comprising:

(A) a stationary frame;

(B) a generally cylindrical carrier rotatably disposed in said frame and defining longitudinally-extending compartments on the periphery thereof for the storage of elongate articles therein;

(C) means for rotating said carrier about its longitudinal axis relative to said frame;

(D) means for feeding an elongate article into an empty one of said compartments without disassembly of said caddy;

(E) means for releasably maintaining the elongate articles fed into said compartments in their respective compartments during rotation of said carrier relative to said frame;

(F) means for discharging from a selected compartment any elongate article therein; and an anti-jamming mechanism for precluding said feed means from feeding an elongate article into a non-empty one of said compartments.

9. The caddy of claim 8 wherein said carrier is rotatable by said rotating means in only one direction of rotation, and said anti-jamming mechanism includes a storage location, disposed intermediate said feed means and one of said compartments aligned with said feed means and offset in the direction of rotation of said carrier relative to said aligned one compartment, for storage of an elongate article when said aligned one compartment is not empty.

10. The caddy of claim 9 wherein said anti-jamming mechanism includes means for relocating an elongate article only partially received in said aligned one compartment from said aligned one compartment and into said storage location as said carrier rotates.

11. The caddy of claim 10 wherein said storage location is configured and dimensioned such that the presence of an elongate article in said storage location blocks said feed means from operation and enables such elongate article in said storage location to feed into the next empty one of said compartments to become aligned with said feed means.

12. The caddy of claim 1 wherein said discharge means is a door movable between a first position precluding discharge of an elongate article form a selected compartment and an open position enabling discharge of an elongate article from a selected compartment

13. The caddy of claim 12 wherein said discharge means additionally includes means for moving said door to its open position, and means for biasing said door to its closed position.

14. The caddy of claim 1 wherein said carrier is rotatably disposed in said frame with its longitudinal axis generally horizontal, and said discharge means discharges the elongate article with the long axis of the elongate article being maintained generally horizontal.

15. A caddy comprising:

(A) a stationary frame;

(B) a generally cylindrical carrier rotatably disposed in said frame with its longitudinal axis generally horizontal and defining longitudinally-extending compartments on the periphery thereof for the storage of elongate articles therein, said compartments being configured and dimensioned to store the elongate articles therein with the longitudinal axes thereof generally horizontal;

(C) means for rotating said carrier about its longitudinal axis relative to said frame in only one direction of rotation;

(D) a hopper for receipt of the elongate articles;

(E) feed means for successively feeding elongate articles from said hopper into successive empty one of said compartments under the influence of gravity as the rotation of said carrier relative to said hopper brings successive empty compartments into operative relationship with said hopper;

(F) an anti-jamming mechanism for precluding said feed means from feeding an elongate article into a non-empty one of said compartments, said anti-jamming mechanism including (i) a storage location, disposed intermediate said feed means and one of said compartments aligned with said feed means and offset in the direction of rotation of said carrier relative to said aligned one compartment, for storage of an elongate article when said aligned one compartment is not empty, and (ii) means for relocating an elongate article only partially received in said aligned one compartment from said aligned one compartment and into said storage location as said carrier rotates, said storage location being configured and dimensioned such that the presence of an elongate article in said storage location blocks said feed means from operation and enables such elongate article in said storage location to feed into the next empty one of said compartments to become aligned with said feed means;

(G) means for releasably maintaining the elongate articles fed into said compartments in their respective compartments during rotation of said carrier relative to said frame; and (H) means for discharging from a selected compartment under the influence of gravity any elongate article therein with the long axis of said elongate article being maintained generally horizontal, said discharge means including a door movable between a first position precluding discharge of an elongate article from a selected compartment and an open position enabling discharge of an elongate article from a selected compartment, means biasing said door to its closed position and means for moving said door to its open position.

* * * * *